No. 850,708. PATENTED APR. 16, 1907.
J. M. WEAVER.
DUST COLLECTOR FOR WHEELED VEHICLES.
APPLICATION FILED NOV. 14, 1906.
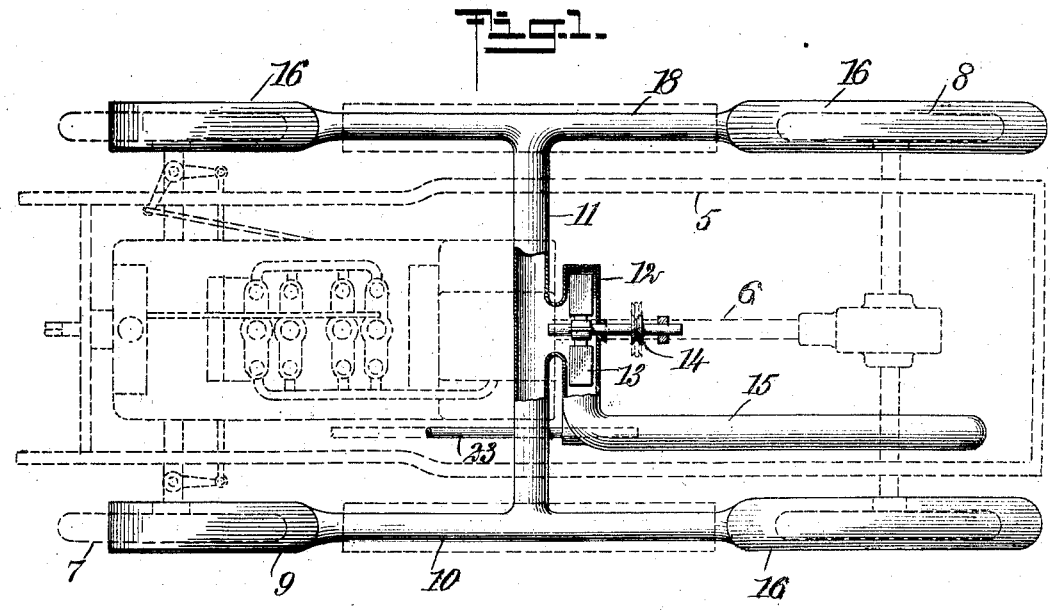
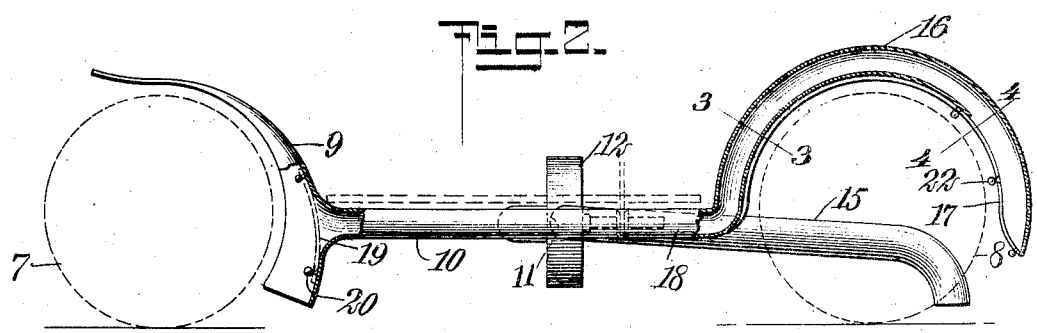
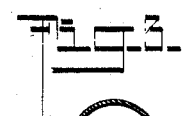 
WITNESSES
INVENTOR
John M. Weaver
BY
ATTORNEYS

UNITED STATES PATENT OFFICE.

JOHN M. WEAVER, OF NEW OXFORD, PENNSYLVANIA.

DUST-COLLECTOR FOR WHEELED VEHICLES.

No. 850,708.  Specification of Letters Patent.  Patented April 16, 1907.

Application filed November 14, 1906. Serial No. 343,368.

*To all whom it may concern:*

Be it known that I, JOHN M. WEAVER, a citizen of the United States, and a resident of New Oxford, in the county of Adams and State of Pennsylvania, have invented a new and Improved Dust-Collector for Wheeled Vehicles, of which the following is a full, clear, and exact description.

This invention relates particularly to improvements in attachments for automobiles or similar vehicles for receiving dust rising from the vehicle-wheels and discharging the same in a wet or condensed condition, thus obviating the annoyance from the spread of dust incident to such vehicles as ordinarily equipped.

I will describe a dust-collector for wheeled vehicles embodying my invention and then point out the novel features in the appended claims.

Reference is to be had to the accompanying drawings, forming a part of this specification, in which similar characters of reference indicate corresponding parts in all the figures.

Figure 1 is a plan of a dust-collector embodying my invention. Fig. 2 is a sectional view thereof. Fig. 3 is a section on the line 3 3 of Fig. 2, and Fig. 4 is a section on the line 4 4 of Fig. 2.

In the drawings I have indicated an automobile-body in dotted lines 5, in which is arranged the usual driving-shaft 6, the body being mounted on the front wheels 7 and the rear wheels 8, also indicated in dotted lines.

The present invention comprises shields or dust-receivers 9, which are curved and extend partly over the front wheels 7, and these shields 9 are connected by means of pipes 10 with a cross-pipe 11, communicating with which is a dust-receiving chamber 12, and operating in this dust-chamber is a suction-fan 13, driven, as here shown, by means of a band connection from the shaft 6 with a pulley 14 on the spindle of the fan, and leading from the dust-receiving chamber 12 is a discharge-pipe 15.

Extending over the rear wheels of the vehicle are tubes 16, which at their lower portions have openings 17 for receiving the dust rising from the action of said rear wheels. These tubes 16 also communicate through pipes or tubes 18 with the cross-tube 11.

In certain cases—that is, when the vehicle is traveling over wet roads—it may be desired to close the dust-discharging device, and therefore I provide the communication between the guards 9 and the tubes 10 with flexible coverings 19, which may be attached to buttons 20, and similar flexible coverings 21 are provided for the opening 17 and secured in place on buttons 22, attached to the tubes 16. Leading into the forward end of the discharge-pipe 15 is an exhaust-pipe 23, leading from a steam-motor on the vehicle.

In operation the dust-discharge from the wheels 7 will pass into the guards 9 and will be drawn by the fan 13 into the chamber 12, and the dust rising from the rear wheels will pass through the tubes or pipes 16 into said chamber 12, and the dust thus collected will be charged with moisture of steam-exhaust, and thus deposited upon the street or road.

In the case of vehicles propelled by gasolene or electric motors the moisture necessary to dampen the dust is to be supplied from a water-tank, conveniently located, and introduced into the pipe 23 by means of a suitable pump, in this event the rear end of pipe 23 to be fitted with a spray-nozzle.

Having thus described my invention, I claim as new and desire to secure by Letters Patent—

1. The combination with an automobile or like device, of a dust-collector comprising dust-receiving devices arranged over the front and rear wheels of the vehicle, a cross-pipe with which said dust-collectors communicate, a dust-receiving receptacle having communication with said cross-pipe, a suction-fan arranged in said receptacle, a discharge-pipe leading from the receptacle, and an exhaust-pipe leading into the discharge-pipe.

2. The combination with an automobile or like vehicle, of a dust-collector comprising dust-receiving devices arranged over the front and rear wheels of the vehicle, a cross-pipe with which said receivers communicate, a dust-receptacle having communication with said cross-pipe, a suction-fan in said receptacle, a discharge-pipe leading from the receptacle, an exhaust leading into said discharge-pipe, and means for closing communication between the dust-receivers over the wheels and said cross-pipe.

3. The combination with an automobile or like device of a dust-collector, comprising dust-receiving devices arranged over the front and rear wheels of the vehicle, a suction-fan arranged centrally of the automobile, a connection between said fan and the dust-collectors, and a discharge-pipe leading from the fan.

In testimony whereof I have signed my name to this specification in the presence of two subscribing witnesses.

JOHN M. WEAVER.

Witnesses:
ELLEN M. STRALEY,
FRANK L. WEAVER.